US008635621B2

(12) United States Patent
Levitan et al.

(10) Patent No.: US 8,635,621 B2
(45) Date of Patent: Jan. 21, 2014

(54) METHOD AND APPARATUS TO IMPLEMENT SOFTWARE TO HARDWARE THREAD PRIORITY

(75) Inventors: David Stephen Levitan, Austin, TX (US); Jeffrey Richard Summers, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1296 days.

(21) Appl. No.: 12/187,351

(22) Filed: Aug. 22, 2008

(65) Prior Publication Data
US 2010/0050178 A1 Feb. 25, 2010

(51) Int. Cl.
G06F 9/30 (2006.01)
G06F 9/46 (2006.01)

(52) U.S. Cl.
USPC ........... 718/103; 718/102; 718/104; 712/208; 712/214

(58) Field of Classification Search
None
See application file for complete search history.

(56) References Cited

U.S. PATENT DOCUMENTS

| 6,374,286 | B1* | 4/2002 | Gee et al. | 718/108 |
| 6,658,447 | B2* | 12/2003 | Cota-Robles | 718/103 |
| 7,634,774 | B2* | 12/2009 | Onufryk et al. | 718/103 |
| 2003/0187905 | A1* | 10/2003 | Ambilkar et al. | 709/100 |
| 2004/0139441 | A1* | 7/2004 | Kaburaki et al. | 718/107 |
| 2005/0149933 | A1* | 7/2005 | Saito et al. | 718/100 |
| 2005/0243847 | A1 | 11/2005 | Bitar et al. | |
| 2006/0059487 | A1 | 3/2006 | Chatterjee | |
| 2006/0123251 | A1* | 6/2006 | Nakajima et al. | 713/300 |
| 2006/0146864 | A1 | 7/2006 | Rosenbluth | |
| 2006/0206692 | A1 | 9/2006 | Jensen | |
| 2007/0089112 | A1 | 4/2007 | Jensen | |
| 2007/0106887 | A1* | 5/2007 | Kissell | 712/228 |
| 2008/0244213 | A1* | 10/2008 | Flemming et al. | 711/173 |
| 2009/0327662 | A1* | 12/2009 | Jiang et al. | 712/217 |

OTHER PUBLICATIONS

Bogdan Caprita; Group Ratio Round-Robin: 0(1) Proportional Share Sche for Uniprocessor and Multiprocessor Systems; Columbia University Technical Report; 2004; 17 pages.*
"Group Ratio Round Robin: O(1) Proportional Share Scheduling for Uniprocessor and Multiprocesor Systems", Caprita et al., USENIX '05 Technical Program, 2005, 33 pages.
"Efficient Fair Queuing Using Deficit Round Robin", Shreedhar et al., SIGCOMM'05, pp. 231-242, 1995.

* cited by examiner

Primary Examiner — Abdullah Al Kawsar
(74) Attorney, Agent, or Firm — Matthew B Talpis; Dianoosh Salehi

(57) ABSTRACT

The invention relates to a method and apparatus for execution scheduling of a program thread of an application program and executing the scheduled program thread on a data processing system. The method includes: providing an application program thread priority to a thread execution scheduler; selecting for execution the program thread from a plurality of program threads inserted into the thread execution queue, wherein the program thread is selected for execution using a round-robin selection scheme, and wherein the round-robin selection scheme selects the program thread based on an execution priority associated with the program thread bit; placing the program thread in a data processing execution queue within the data processing system; and removing the program thread from the thread execution queue after a successful execution of the program thread by the data processing system.

1 Claim, 4 Drawing Sheets

METHOD AND APPARATUS TO IMPLEMENT SOFTWARE TO HARDWARE THREAD PRIORITY

BACKGROUND

1. Field of the Invention

The present invention relates in general to an improved method and apparatus for computer data processing; and in particular, to an improved high performance multithreaded computer data processing system and method embodied in the hardware of the processor.

2. Description of Related Art

The fundamental structure of a modern computer includes peripheral devices to communicate information to and from the outside world; such peripheral devices, for example, may be keyboards, monitors, tape drives, communication lines coupled to a network. Also included in the basic structure of the computer is the hardware necessary to receive, process, and deliver this information from and to the outside world, including busses, memory units, input/output (I/O) controllers, storage devices, and at least one central processing unit (CPU). The CPU is the brain of the system. It executes the instructions which comprise a computer program and directs the operation of the other system components.

From the standpoint of the computer's hardware, most systems operate in fundamentally the same manner. Processors actually perform very simple operations quickly, such as arithmetic, logical comparisons, and movement of data from one location to another. Programs which direct a computer to perform massive numbers of these simple operations give the illusion that the computer is doing something sophisticated. What is perceived by the user as a new or improved capability of a computer system, however, may actually be the machine performing the same simple operations, but much faster. Therefore continuing improvements to computer systems require that these systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. Thus, if everything runs twice as fast but otherwise works in exactly the same manner, the system will perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designers, however, think that physical size reductions cannot continue indefinitely and there are limits to continually increasing processor clock speeds. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the CPU to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously.

It is much more difficult, however, to improve the speed at which a single task, such as an application program, executes. Coordinating the execution and delivery of results of various functions among multiple CPUs is tricky. For slave I/O processors this is not so difficult because the functions are predefined and limited but for multiple CPUs executing general purpose application programs it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial transactions which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly as mentioned earlier. As semiconductor technology has advanced, the goal of RISC architecture has been to develop processors capable of executing one or more instructions on each clock cycle of the machine.

Another approach to increase the average number of operations executed per clock cycle is to modify the hardware within the CPU. This throughput measure, clock cycles per instruction, is commonly used to characterize architectures for high performance processors. Instruction pipelining and cache memories are computer architectural features that have made this achievement possible. Pipeline instruction execution allows subsequent instructions to begin execution before previously issued instructions have finished. Cache memories store frequently used and other data closest to the processor and allow instruction execution to continue, in most cases, without waiting the full access time of a main memory. Some improvement has also been demonstrated with multiple execution units with lookahead hardware for finding instructions to execute in parallel.

The performance of a conventional RISC processor can be further increased in the superscalar computer and the Very Long Instruction Word (VLIW) computer, both of which execute more than one instruction in parallel per processor cycle. In these architectures, multiple functional or execution units are provided to run multiple pipelines in parallel. In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as a predefined rules are satisfied.

For both in-order and out-of-order completion of instructions in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be completed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

And yet another technique to improve the efficiency of hardware within the CPU is to divide a processing task into independently executable sequences of instructions called threads. This technique is related to breaking a larger task into smaller tasks for independent execution by different processors except here the threads are to be executed by the same processor. When a CPU then, for any of a number of reasons, cannot continue the processing or execution of one of these threads, the CPU switches to and executes another thread. The term "multithreading" as defined in the computer architecture community is not the same as the software use of the term which means one task subdivided into multiple related threads. In the architecture definition, the threads may be independent. Therefore "hardware multithreading" is often used to distinguish the two uses of the term. Within the context of the present invention, the term multithreading connotes hardware multithreading to tolerate memory latency.

Multithreading permits the processors' pipeline(s) to do useful work on different threads when a pipeline stall condition is detected for the current thread. Multithreading also permits processors implementing non-pipeline architectures to do useful work for a separate thread when a stall condition is detected for a current thread. There are two basic forms of multithreading. A traditional form is to keep N threads, or states, in the processor and interleave the threads on a cycle-by-cycle basis. This eliminates all pipeline dependencies because instructions in a single thread are separated. The other form of multithreading, and the one considered by the present invention, is to interleave the threads on some long-latency event.

Traditional forms of multithreading involves replicating the processor registers for each thread. For instance, for a processor implementing the architecture sold under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers. Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. Fortunately, there is no need to replicate some of the larger functions of the processor such as: level one instruction cache (L1 I-cache), level one data cache (L1 D-cache), instruction buffer, store queue, instruction dispatcher, functional or execution units, pipelines, translation lookaside buffer (TLB), and branch history table.

Thus, there is a need for an improved method of implementing software thread priority where if one thread gets a cache miss then other threads will be given more processor resources.

SUMMARY

In one embodiment, the invention relates to a method for execution scheduling of a program thread of an application program and executing the scheduled program thread on a data processing system, the method comprising: providing an application program thread priority to a thread execution scheduler; normalizing the application program thread priority using an increment function, wherein the increment function is executed by the thread execution scheduler; decoding the normalized application program thread priority into a data processor priority count using a decoder, wherein the decoder is programmable to achieve a desired thread performance; inserting the program thread into a thread execution queue within the thread execution scheduler, wherein the program thread is inserted into the thread execution queue based on the data processor priority count; setting a program thread bit in the thread execution queue, wherein the program thread bit is uniquely associated with the program thread; selecting for execution the program thread from a plurality of program threads inserted into the thread execution queue, wherein the program thread is selected for execution using a round-robin selection scheme, and wherein the round-robin selection scheme selects the program thread based on an execution priority associated with the program thread bit; placing the program thread in a data processing execution queue within the data processing system; and removing the program thread from the thread execution queue after a successful execution of the program thread by the data processing system.

BRIEF DESCRIPTION OF THE DRAWINGS

These and other embodiments of the invention will be discussed with reference to the following non-limiting and exemplary illustrations, in which like elements are numbered similarly, and where.

DETAILED DESCRIPTION

Figure 1:
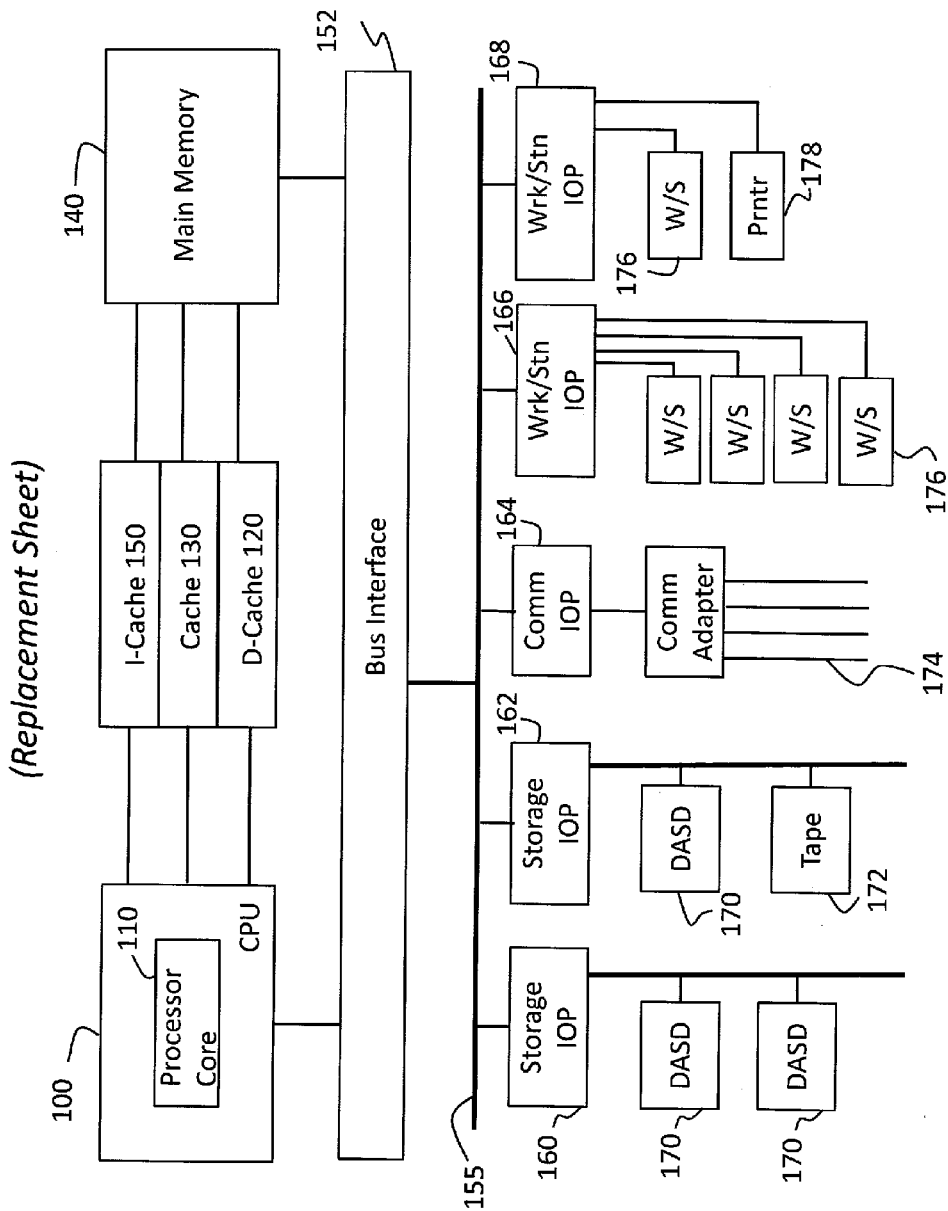
FIG. 1 is a block diagram of a computer system for implementing the present invention.

FIG. 1 is a block diagram of a computer system for implementing the present invention. The primary hardware components and interconnections of computer data processing system 10 capable of utilizing the present invention are shown in FIG. 1. Central processing unit (CPU) 100 for processing instructions is coupled to caches 120, 130, and 150. Instruction cache 150 stores instructions for execution by CPU 100. Data caches 120, 130 store data to be used by CPU 100. The caches communicate with random access memory in main memory 140. CPU 100 and main memory 140 also communicate via bus interface 152 with system bus 155. Various input/output processors (IOPs) 160-168 attach to system bus 155 and support communication with a variety of storage and input/output (I/O) devices, such as direct access storage devices (DASD) 170, tape drives 172, remote communication lines 174, workstations 176, and printers 178. It should be understood that FIG. 1 is intended to depict representative components of computer data processing system 10 at a high level, and that the number and types of such components may vary.

Figure 2:
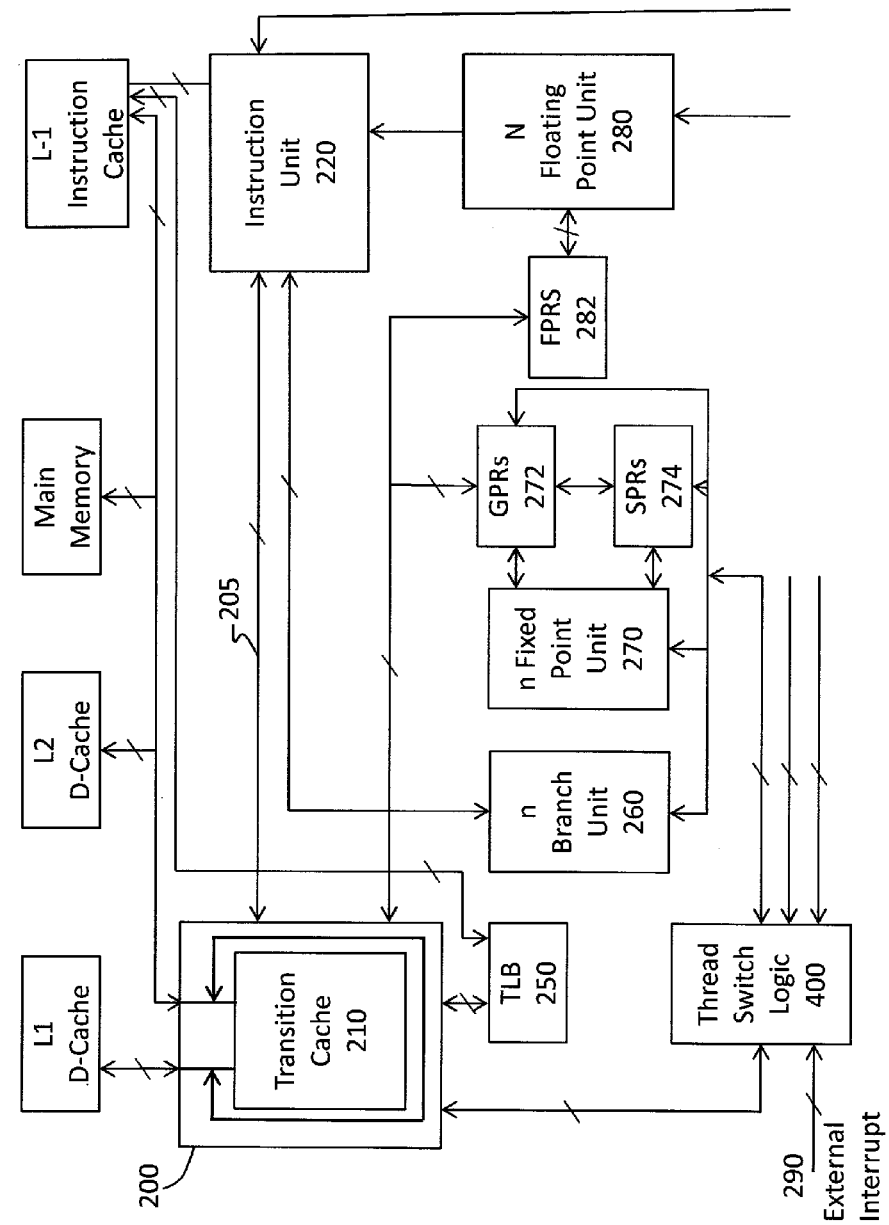
FIG. 2 is a block diagram of a multithreaded data processing system according to an embodiment of the present invention.

Within CPU 100, processor core 110 contains specialized functional units, each of which perform primitive operations, such as sequencing instructions, executing operations involving integers, executing operations involving real numbers, transferring values between addressable storage and logical register arrays. FIG. 2 illustrates processor core 100. In a preferred embodiment, processor core 100 is a single integrated circuit, pipelined, superscalar microprocessor, which may be implemented utilizing any computer architecture such as the family of RISC processors sold under the trade name PowerPC™; for example, the PowerPC™ 604 microprocessor chip sold by IBM™.

As will be discussed below, data processing system 10 preferably includes various units, registers, buffers, memories, and other sections which are all preferably formed by integrated circuitry. It should be understood that in the figures, the various data paths have been simplified; in reality, there are many separate and parallel data paths into and out of the various components. In addition, various components not germane to the invention described herein have been omitted, but it is to be understood that processors contain additional units for additional functions. Data processing system 10 can operate according to reduced instruction set computing, RISC, techniques or other computing techniques.

FIG. 2 is a block diagram of a multithreaded data processing system according to an embodiment of the present invention. Referring now to FIG. 1 and FIG. 2 simultaneously, processor core 100 preferably includes level one data cache, L1 D-cache 120, level two L2 cache 130, main memory 140, and level one instruction cache, L1 I-cache 150, all of which are operationally interconnected utilizing various bus connections to storage control unit 200. Storage control unit 200 includes transition cache 210 for interconnecting L1 D-cache 120 and L2 cache 130, main memory 140, and a plurality of execution units. L1 D-cache 120 and L1 I-cache 150 preferably are provided on chip as part of processor 100 while main memory 140 and L2 cache 130 are provided off chip. Memory system 140 is intended to represent random access main memory which may or may not be within processor core 100 and, and other data buffers and caches, if any, external to the processor core 100, and other external memory, for example, DASD 170, tape drives 172, and workstations 176, shown in FIG. 1. L2 cache 130 is preferably a higher speed memory system than main memory 140, and by storing selected data within L2 cache 130, the memory latency which occurs as a result of a reference to main memory 140 can be minimized. As shown in FIG. 1, L2 cache 130 and main memory 140 are directly connected to both L1 I-cache 150 and instruction unit 220 via storage control unit 200.

Instructions from L1 I-cache 150 are preferably output to instruction unit 220 which, in accordance with the method and system of the present invention, controls the execution of multiple threads by the various subprocessor units, e.g., branch unit 260, fixed point unit 270, storage control unit 200, and floating point unit 280 and others as specified by the architecture of data processing system 10. In addition to the various execution units depicted within FIG. 1, those skilled in the art will appreciate that modem superscalar microprocessor systems often include multiple versions of each such execution unit which may be added without departing from the spirit and scope of the present invention. Most of these units will have as an input source operand information from various registers such as general purpose registers GPRs 272, and floating point registers FPRs 282. Additionally, multiple special purpose register SPRs 274 may be utilized. As shown in FIG. 1, storage control unit 200 and transition cache 210 are directly connected to general purpose registers 272 and the floating point registers 282. General purpose registers 272 are connected to special purpose registers 274.

Among the functional hardware units unique to multithreaded processor 100 is thread switch logic 400 and transition cache 210. The thread switch logic contains various registers that determine which thread will be the active or the executing thread. Thread switch logic 400 is operationally connected to storage control unit 200, execution units 260, 270, and 280, and instruction unit 220. Transition cache 210 within storage control unit 200 must be capable of implementing multithreading. Preferably, storage control unit 200 and transition cache 210 permit at least one outstanding data request per thread. Thus, when a first thread is suspended in response to, for example, the occurrence of L1 D-cache miss, a second thread would be able to access L1 D-cache 120 for data present therein. If the second thread also results in L1 D-cache miss, another data request will be issued and thus multiple data requests must be maintained within storage control unit 200 and transition cache 210. Storage control unit 200, execution units 260, 270, and 280 and instruction unit 220 are all operationally connected to the thread switch logic which determines which thread to execute.

As illustrated in FIG. 2, bus 205 is provided between storage control unit 200 and instruction unit 220 for communication of, e.g., data requests to storage control unit 200, and L2 cache 130 miss to instruction unit 220. Further, translation lookaside buffer TLB 250 is provided which contains virtual-to-real address mapping. Although not illustrated within the present invention various additional high level memory mapping buffers may be provided such as a segment lookaside buffer which will operate in a manner similar to translation lookaside buffer 250.

Figure 3:
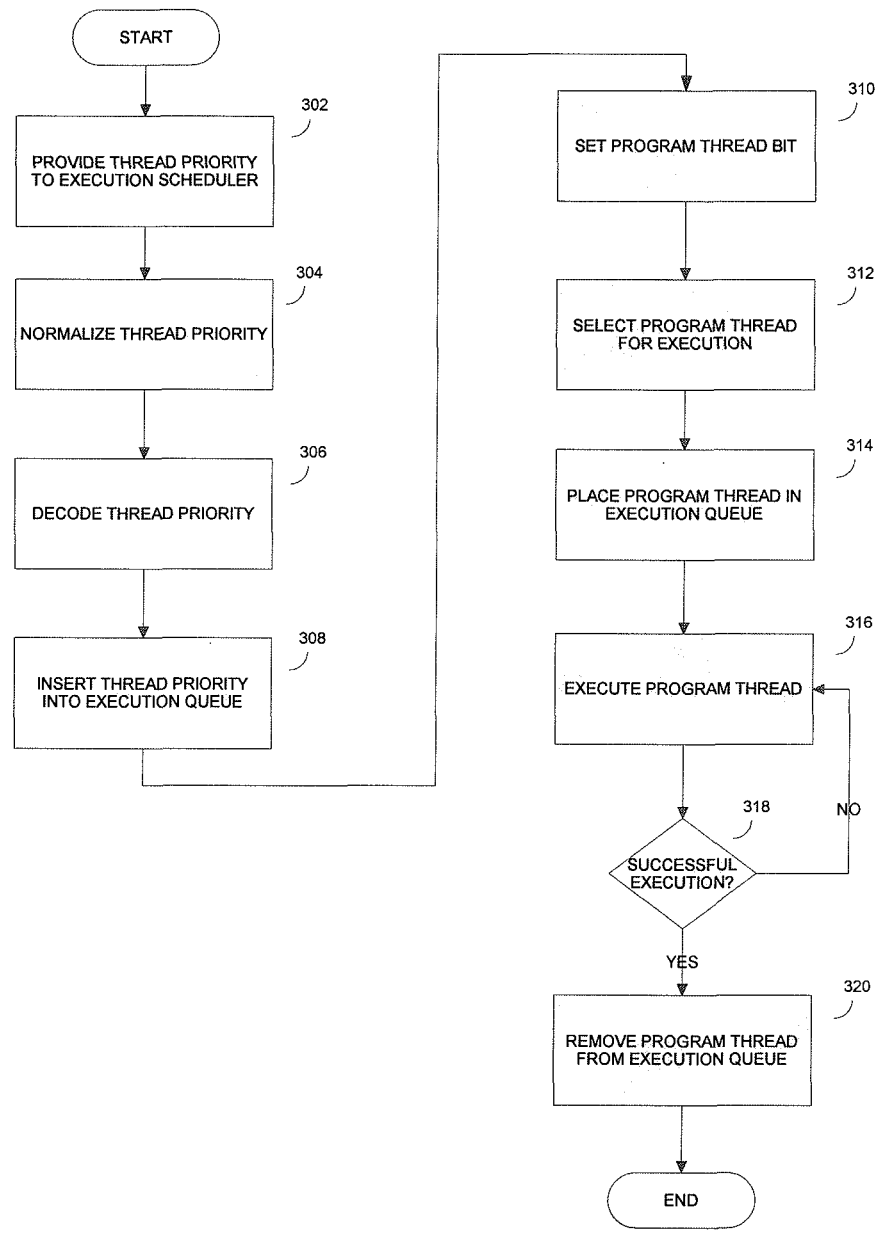
FIG. 3 is a flowchart illustrating the process of implementing a thread priority.

FIG. 3 is a flowchart illustrating the process of implementing a thread priority. Those skilled in the art will appreciate from the following description that although the steps comprising the flowchart are illustrated in a sequential order, many of the steps illustrated in FIG. 3 can be performed concurrently or in an alternative order.

The process begins at step 302, where an application thread priority is provided to a thread execution scheduler. In an embodiment of this invention, a hardware event can alter thread priority. However, the base thread priority of a thread is assigned by software. For instance, a low-priority thread may be waiting on an event, which when the event occurs, a hardware event can raise the priority of the thread to influence the response time of the thread to the event. Relative priorities between threads or the priority of a certain thread will influence the handling of such an event. The priorities of the threads can be adjusted by thread switch logic through the use of one or more instructions, or by a hardware event.

The process continues from step 302 to step 304, where the thread priority is normalized. The purpose of normalization is to ensure that at least on thread will have the highest priority. A plurality of threads will have relative priorities to each other. By normalizing the priorities, at least one of the threads will have the highest priority relative to the other threads in the plurality of threads. In an embodiment, the normalization process is achieved through an increment function. However, any common normalization techniques generally known in the art can be employed to normalize the thread priority.

The process continues from step 304 to step 306, where a decoder converts the thread priority to a priority count. When each thread's priority count reaches zero, that thread is inserted into the round-robin queue. In step 308, a simple round-robin algorithm is used as a default to distribute thread execution among the available threads on an equal basis, and thus balance resource utilization. The thread priority is inserted into a thread execution queue. However, any number of alternative methods for assigning a thread to the thread execution queue. can be utilized. In the case of only one thread in the round-robin queue, or when there are no threads selected by the round-robin queue, each thread's priority count is decremented by one when its current value is not zero, but is forced to its normalized priority value when its current value is zero.

In an embodiment of the invention, the decoder can be designed to achieve any desired relative thread performance. This is described below as priority decode table 408 in FIG. 4. The decoder may be programmable if additional flexibility and control of the thread performance is required.

In step 310, one program thread bit for each thread is set in the round-robin queue. If the bit associated a thread is set, then the thread will take its turn to be selected for execution. In step 312, a program thread is selected for execution based on priority. If only one thread is set in the round-robin queue, then only that particular thread will get selected for execution. If multiple bits are set in the round-robin queue, then the first thread will take its turn to be selected for execution and placed in an execution queue at step 314, and then that thread will executed at step 316. If the execution is determined to be successful at step 318, then the thread is removed from the round-robin queue in step 320. Otherwise the thread's turn is forfeited at step 319. This process proceeds until all of the threads in the round-robin queue have had their turn and have been given a turn to be selected for execution.

Figure 4:
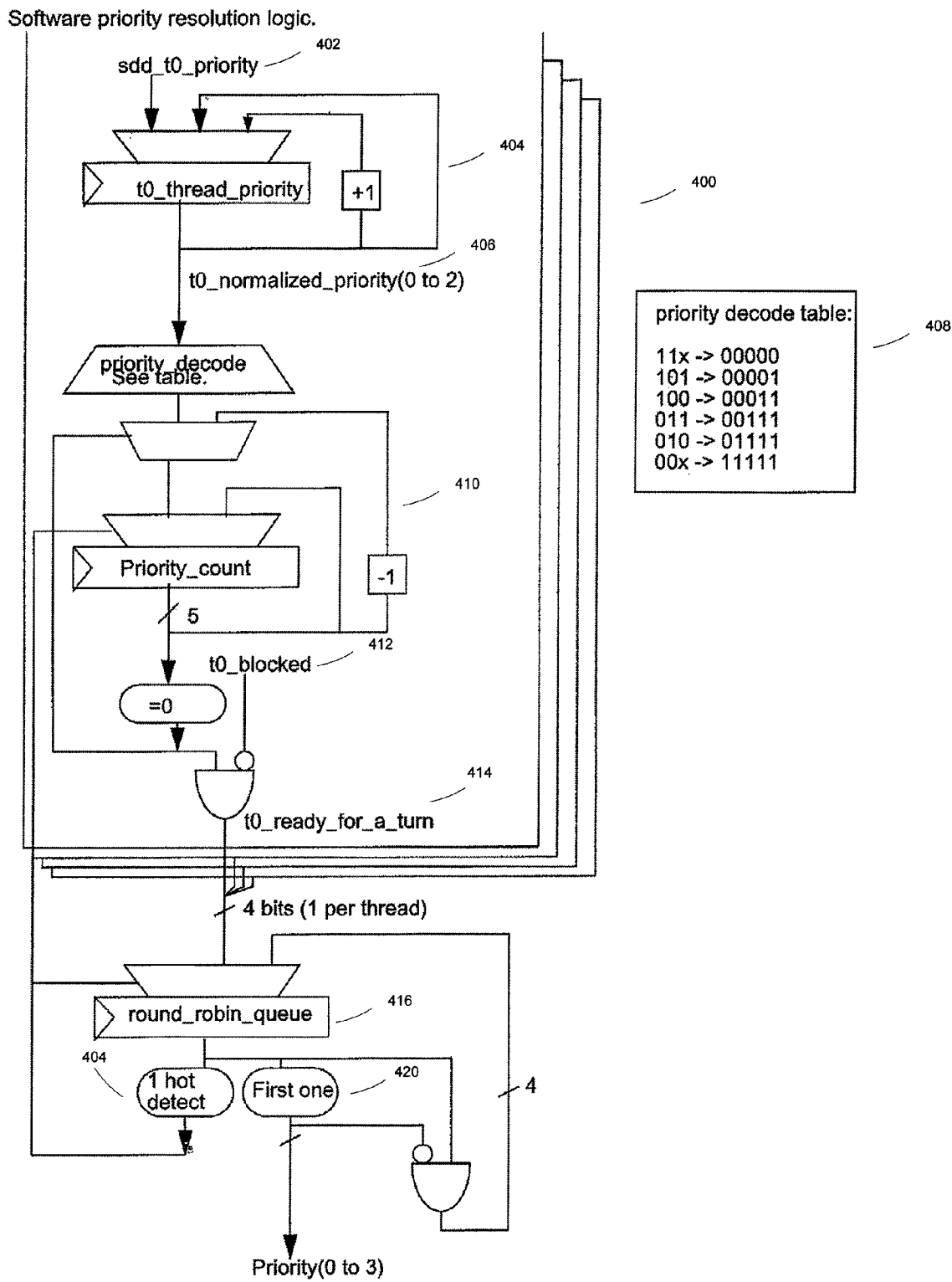
FIG. 4 is a diagram of the software resolution logic according to an embodiment of the present invention.

FIG. 4 is a diagram of the software resolution logic according to an embodiment of the present invention.

In PowerPC™ microprocessors, the highest priority that is assigned is 6. Each decrement in priority represents a halfing of priority. For example, a priority 6 thread receives twice the resources as a priority 5 thread, and four times the resources as a priority 4 thread, and so on.

The multithreaded application 400 includes one thread. In the embodiment depicted in FIG. 4, there are four threads. The priority normalization logic interacts with each of the priority registers of all four threads. Normalization ensures that at least one thread will have the highest priority. There is only one round robin queue that each of the four threads are fed into. SDD_T0_PRIORITY 402 is the thread priority for the first thread, T0. T0 is normalized by normalization function 404, and the result is T0_NORMALIZED_PRIORITY(0 to 2) 406.

The normalization function 404 will depend on how the relative priorities operate. For example, for PowerPC™ microprocessors, normalization can be achieved by adding the same amount to each thread such that at least one of the threads has a highest priority, or a priority of 6 in an embodiment of the present invention. The normalization can occur in a single cycle or over multiple cycles to save hardware.

T0_NORMALIZED_PRIORITY 406 is then decoded according to priority decode table 408, where T0_NORMALIZED_PRIORITY 406 is converted to a priority count. 1 hot detect 404 determines if a thread is the last thread in the round robin queue. 1 hot detect logic is used to detect if there is only one thread active in the round robin queue. When the last thread is selected in the round robin queue and the priority count is not 0, then the priority count is decremented.

T0_BLOCKED 412 is returned is T0 cannot participate in round robin queue 416 due to unavailability of T0 or a predetermined criteria which excludes T0 from the queue.

If the priority count equals zero, then T0 is ready for a turn in round robin queue 416, denoted by T0 READY_FOR_A_TURN 414. Only the threads that have a priority count of 0 enter the round robin queue. Once all eligible threads from the previous round robin queue are given a turn, the priority count values are updated as described above. New T0_READY_FOR_A_TURN 414 values are generated and loaded into the round robin queue 416. Each thread that is ready to take a turn will be selected in round-robin order until all have had a turn. T0 has its turn first if it is in the round robin queue, followed by T1, T2, etc. Each thread that is in the round robin queue gets a turn and when the last thread is selected, then the priority counts are updated and the round robin queue is reloaded. This cycle then repeats.

While the specification has been disclosed in relation to the exemplary and non-limiting embodiments provided herein, it is noted that the inventive principles are not limited to these embodiments and include other permutations and deviations without departing from the spirit of the invention.

What is claimed is:

1. A method for execution scheduling of program thread of an application and executing the scheduled program thread on a data processing system, the method comprising:
   providing an application program thread priority assigned by the application to a thread execution scheduler;
   normalizing the application program thread priority using an increment function to identify a relative priority of the program thread from a plurality of program threads provided to the thread execution scheduler, wherein the increment function is executed by the thread execution scheduler;
   decoding the normalized application program thread priority into a data processor priority count using a decoder, wherein the decoder is programmable to achieve a desired thread performance based on the data processor priority count;
   inserting the program thread into a thread execution queue within the thread execution scheduler when the data processing priority count associated with the program thread reaches zero;
   setting a program thread bit in the thread execution queue, wherein the program thread bit is uniquely associated with the program thread and identifies the program thread being ready to be selected for execution;
   selecting for execution the program thread from a plurality of program threads inserted into the thread execution queue, wherein the program thread is selected for execution using a round-robin selection scheme from the plurality of program threads having associated program thread bit in the thread execution queue;
   placing the selected program thread in a data processing execution queue within the data processing system; and removing the program thread from the thread execution queue after a successful execution of the program thread by the data processing system.

\* \* \* \* \*